(12) United States Patent
Enomoto et al.

(10) Patent No.: US 9,605,990 B2
(45) Date of Patent: Mar. 28, 2017

(54) LIQUID CONTAINER AND METHOD FOR MEASURING LIQUID LEVEL USING SAME

(71) Applicant: ADEKA CORPORATION, Tokyo (JP)

(72) Inventors: Yoshiji Enomoto, Tokyo (JP); Kazuto Takahashi, Tokyo (JP)

(73) Assignee: ADEKA CORPORATION, Tokyo (JP)

( * ) Notice: Subject to any disclaimer, the term of this patent is extended or adjusted under 35 U.S.C. 154(b) by 158 days.

(21) Appl. No.: 14/419,331

(22) PCT Filed: Jul. 29, 2013

(86) PCT No.: PCT/JP2013/070486
§ 371 (c)(1),
(2) Date: Feb. 3, 2015

(87) PCT Pub. No.: WO2014/027561
PCT Pub. Date: Feb. 20, 2014

(65) Prior Publication Data
US 2015/0185065 A1  Jul. 2, 2015

(30) Foreign Application Priority Data
Aug. 13, 2012 (JP) ................................ 2012-179357

(51) Int. Cl.
*G01F 23/28* (2006.01)
*G01F 23/00* (2006.01)
(Continued)

(52) U.S. Cl.
CPC ........ *G01F 23/2962* (2013.01); *G01F 23/296* (2013.01)

(58) Field of Classification Search
None
See application file for complete search history.

(56) References Cited

U.S. PATENT DOCUMENTS 6,729,184 B2 * 5/2004 Tsukada ................... B41J 29/38
                                                                 347/7
7,966,136 B2 * 6/2011 Reimer ............... G01F 25/0061
                                                                 702/55
(Continued)

FOREIGN PATENT DOCUMENTS

JP              4120560              5/2008

*Primary Examiner* — Peter Macchiarolo
*Assistant Examiner* — Jermaine Jenkins
(74) *Attorney, Agent, or Firm* — Wenderoth, Lind & Ponack, L.L.P.

(57) ABSTRACT

A liquid container includes: a container main body which stores a liquid; an ultrasonic sensor which is disposed so as to contact an outer side wall of the container main body and so as to emit an ultrasonic wave into the liquid; and a reflecting means which is disposed at an inner bottom portion of the container main body and reflects the ultrasonic wave emitted into the liquid from the ultrasonic sensor towards a surface of the liquid, the reflecting means being disposed at a position where a distance the ultrasonic wave travels through the liquid in a path of the ultrasonic wave from the ultrasonic sensor to a reflecting surface of the reflecting means, is greater than a distance at which an insensitive band of the ultrasonic sensor is obtained.

14 Claims, 5 Drawing Sheets

(51) Int. Cl.
*G01F 19/00* (2006.01)
*G01F 25/00* (2006.01)
*G01S 15/00* (2006.01)
*G01F 23/296* (2006.01)

(56) References Cited

U.S. PATENT DOCUMENTS

| | | | |
|---|---|---|---|
| 8,511,159 B2* | 8/2013 | Klofer | G01F 23/284 324/637 |
| 8,583,387 B2* | 11/2013 | Murphy | G01F 23/2962 702/45 |
| 8,733,153 B2* | 5/2014 | Reimer | F01N 3/2066 73/290 V |
| 2010/0018309 A1* | 1/2010 | Marcovecchio | G01F 23/2962 73/290 V |
| 2011/0232381 A1* | 9/2011 | Al-Absi | G01F 23/2962 73/290 V |

* cited by examiner

(12) United States Patent — US 9,605,990 B2

LIQUID CONTAINER AND METHOD FOR MEASURING LIQUID LEVEL USING SAME

TECHNICAL FIELD

The present invention relates to a liquid container, and a method for measuring a liquid level using the liquid container, whereby the level of a liquid stored inside the container can be measured from the outside.

BACKGROUND ART

Conventionally, many containers are known in which the level of liquid stored inside the container is detected or measured by using an ultrasonic sensor. Of these, in containers which may produce problems such as soiling of the stored liquid or corrosion of the ultrasonic sensor, when the ultrasonic sensor is installed inside the container (for example, containers for raw materials for chemical vapor-phase epitaxy which are used in the manufacture of semiconductors, etc., a battery case for an automobile, and so on), the ultrasonic sensor must be provided outside the container and the liquid level must be detected or measured from the outside.

Therefore, various technologies meeting these requirements have been proposed. For example, Japanese Patent Application Publication No. 2000-121410 discloses a liquid level detection device including: an ultrasonic sensor which abuts against an outside side surface of a container; a displacement means for displacing the ultrasonic sensor in a perpendicular direction along the outside side surface; and a liquid surface detection means for detecting a liquid level on the basis of change in the output level of a reflected wave relating to an ultrasonic wave emitted inside the container. Furthermore, Japanese Patent Application Publication No. 2000-314651 discloses a liquid level detection device including: a piezoelectric element installed on an outside bottom surface of a tank, via a matching layer; an ultrasonic wave emission means for emitting an ultrasonic wave inside the tank by causing the piezoelectric element to vibrate in a thickness direction; an ultrasonic wave receiving means which receives the ultrasonic wave reflected back by a surface of liquid stored inside the tank; and a liquid level detection means for detecting an absolute value of the level of liquid stored inside the tank, on the basis of the time from emission of the ultrasonic wave until receiving the reflected ultrasonic wave. Furthermore, Japanese Patent Application Publication No. 2009-544045 discloses an ultrasonic sensor for determining a liquid level provided with an ultrasonic wave transmitter and receiver which is located outside a housing that has a mutually connected measurement chamber and entry chamber, in the base of the housing at the periphery of the measurement chamber.

Technical Problem

However, the liquid level detection device disclosed in Japanese Patent Application Publication No. 2000-121410 repeats an operation of displacing an ultrasonic sensor, emitting an ultrasonic wave, and detecting whether or not there is liquid, and there is a problem in that it takes time to measure the liquid level. Furthermore, with the liquid level detection device disclosed in Japanese Patent Application Publication No. 2000-314651 and the ultrasonic sensor disclosed in Japanese Patent Application Publication No. 2009-544045, the ultrasonic sensor is disposed in a bottom portion, and therefore the level of the liquid stored inside the container can no longer be measured when the level becomes equal to or lower than a prescribed value. This is because the ultrasonic sensor has a region in which measurement is not possible (also called an "insensitive band").

SUMMARY OF INVENTION

Therefore, the problem to be solved by the present invention is to provide a liquid container whereby a liquid level can be measured in a short time without being affected by the insensitive band of the ultrasonic sensor, even when the liquid level is low.

Solution to the Problem

As a result of thorough research, the present inventors, and others, discovered that the aforementioned problem can be solved, by providing reflecting means capable of reflecting an ultrasonic wave emitted into liquid from an ultrasonic sensor, towards the surface of the liquid, and thereby arrived at the present invention.

More specifically, the present invention provides a liquid container, including: a container main body which stores a liquid; an ultrasonic sensor which is disposed so as to contact an outer side wall of the container main body and so as to emit an ultrasonic wave into the liquid; and reflecting means which is disposed at an inner bottom portion of the container main body and reflects an ultrasonic wave emitted into the liquid from the ultrasonic sensor, towards the liquid surface; wherein the reflecting means is disposed at a position, where a distance the ultrasonic wave travels through the liquid, of the path of the ultrasonic wave from the ultrasonic sensor to a reflecting surface of the reflecting means, is greater than a distance at which an insensitive band of the ultrasonic sensor is obtained.

Advantageous Effects of the Invention

According to the present invention, even if the liquid level is low, it is possible to measure the liquid level in a short time, without being affected by the insensitive band of the ultrasonic sensor.

DESCRIPTION OF EMBODIMENTS

An embodiment of the present invention will be described with reference to the drawings. However, the present invention is not limited in any way by the drawings described below.

Figure 1:
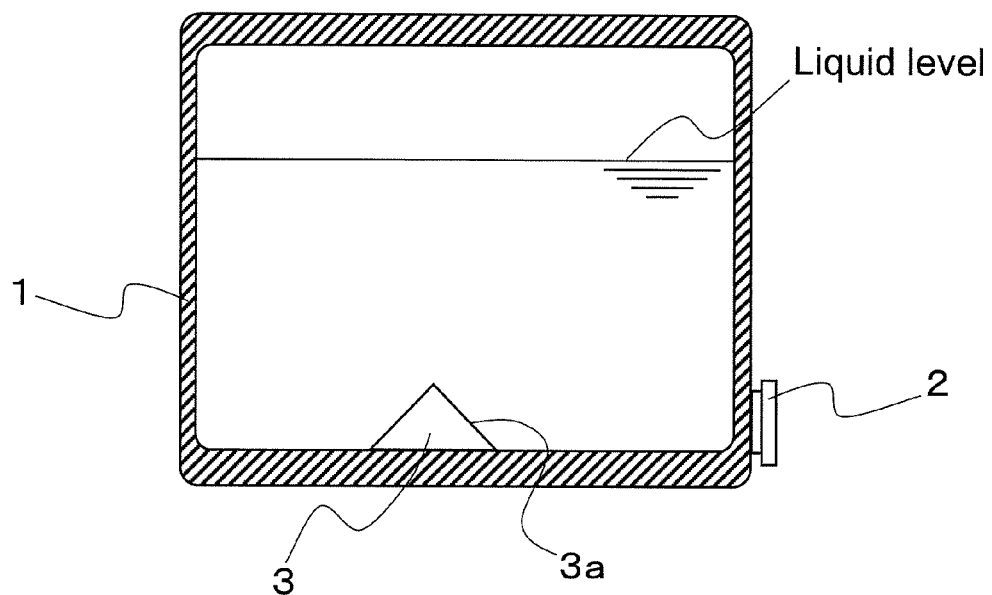
FIG. 1 is a schematic drawing of a liquid container according to an embodiment of the present invention.

FIG. 1 is a schematic drawing of a liquid container relating to an embodiment of the present invention. In FIG. 1, the liquid container according to the present invention includes a container main body 1 which stores liquid, an ultrasonic sensor 2 and reflecting means 3. The container main body 1 has a cylindrical shape composed by a ceiling, side walls and a bottom plate. The shape of the container main body 1 used in the present invention is not limited to this, provided that the shape has a capacity to store a prescribed amount of liquid. Further possible shapes of the container main body 1 are, for example, a round conical shape, a square bar shape, a square cone shape, or the like, but a desirable shape of the container main body 1 is a cylindrical shape, when the ease of cleaning is taken into consideration.

The material of the container main body 1 used in the present invention is not limited in particular, but should be a material which does not cause alteration of the container main body 1 or the liquid stored in the container, due to contact between the container main body 1 and the liquid stored inside the container. The material of the container main body 1 may be, for example, glass, metal, plastic, stainless steel, Teflon (registered trademark), or the like. In the case of a container which is used in order to store a compound of high purity which is used as a raw material for chemical vapor-phase epitaxy, stainless steel is especially desirable, since the container has high cleanability and high strength and there is little alteration of the liquid stored inside the container.

The ultrasonic sensor 2 is a sensor which detects and measures the presence or absence of an object and the distance to the object, by emitting an ultrasonic wave towards an object, from a wave transmitter, and receiving a corresponding reflected wave. The ultrasonic sensor 2 is installed on the container main body 1 in a state of contact with the lowermost portion of the outer surface of a side wall of the container main body 1. An ultrasonic wave from the ultrasonic sensor 2 is emitted into the liquid stored in the container main body 1, via the side wall. The ultrasonic sensor 2 used in the present invention is not limited in particular, and it is possible to use a well-known generic ultrasound sensor. Furthermore, the ultrasonic sensor 2 may be fixed to the outer surface of the side wall of the container main body 1, or may be detachable.

The reflecting means 3 is a member having a reflecting surface 3a that is inclined with respect to the perpendicular direction, and is installed on the upper surface of the bottom plate inside the container main body 1. The shape of the reflecting means 3 used in the present invention is, for example, a square conical shape, plate shape, cube shape, cuboid shape, square bar shape, or the like, or may be a combination of these shapes. The material of the reflecting means 3 used in the present invention is not limited in particular, provided that it is capable of reflecting ultrasonic waves, and more specifically, the material may be glass, metal, plastic, stainless, Teflon (registered trademark), or the like. The material of the reflecting means 3 may be the same as or different from the material used in the container main body 1, but if the material is different, there is a risk that liquid leaks may occur from the joint sections, and a risk of restriction on the type of detergent that can be used when washing the interior of the container, and therefore it is desirable to use the same material as the container main body 1. Moreover, if the liquid container relating to the present invention is used to store a compound of high purity which is used as a raw material for chemical vapor phase epitaxy, then the material of the reflecting means 3 is desirably stainless steel, since there is little alteration of the liquid stored inside the container. Furthermore, the reflecting means 3 may be integrated with the container main body 1, or may be installed by welding or by fixing members, typically, screws, bolts, or the like.

Moreover, the reflecting means 3 is arranged in such a manner that the ultrasonic sensor 2 and the reflecting surface 3a of the reflecting means 3 face each other. Furthermore, the angle of inclination of the reflecting surface 3a is not limited in particular, provided that an ultrasonic wave emitted from the ultrasonic sensor 2 can be turned towards the liquid surface. The ultrasonic wave emitted into the liquid from the ultrasonic sensor 2 is reflected by the reflecting surface 3a of the reflecting means 3 towards the liquid surface. The reflected wave which is further reflected by the liquid surface is reflected again by the reflecting surface 3a towards the ultrasonic sensor 2, and arrives at the ultrasonic sensor 2.

As is well-known, the ultrasonic sensor has a region where measurement is not possible (insensitive band). Therefore, if the distance from the ultrasonic sensor to the liquid surface is smaller than the distance which forms an insensitive band, then the liquid level cannot be measured. In the present invention, the reflecting means 3 is installed at a position where the distance the ultrasonic wave passes through the liquid, of the ultrasonic wave path from the ultrasonic sensor 2 to the reflecting surface 3a of the reflecting means 3, is greater than the distance at which an insensitive band is obtained in the ultrasonic sensor 2. Therefore, it is possible to measure the liquid level in a short period of time, without being affected by the insensitive band of the ultrasonic sensor 2, provided that the liquid surface is higher than the reflection position of the ultrasonic wave on the reflecting surface 3a.

Figure 2:
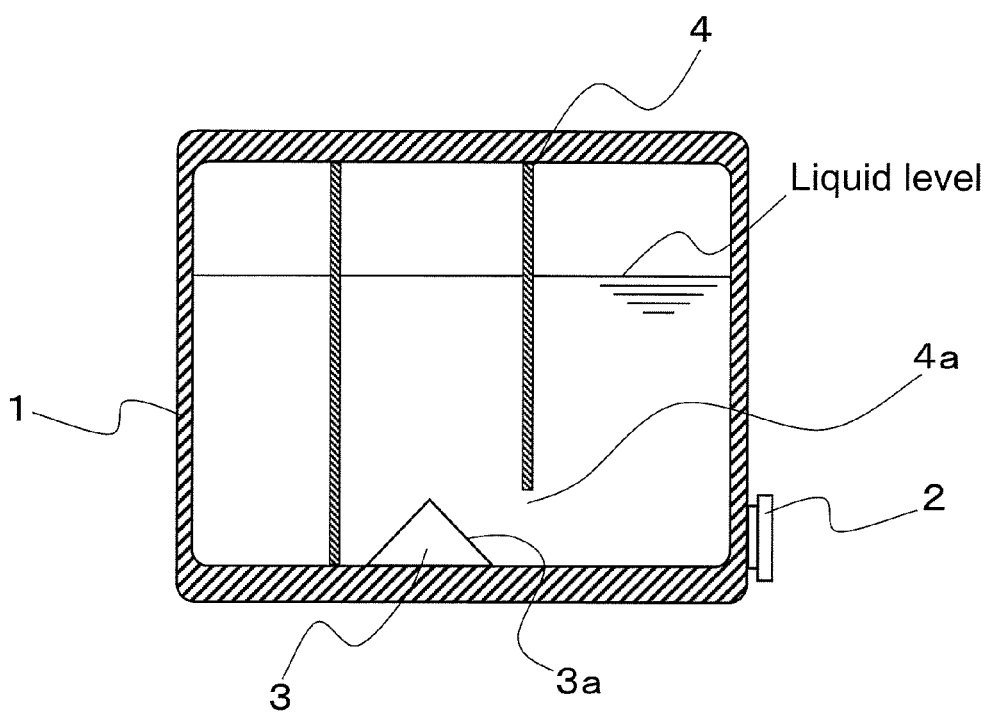
FIG. 2 is a schematic drawing of a liquid container according to the embodiment of the present invention.

FIG. 2 is a schematic drawing of a liquid container relating to a further embodiment of the present invention. In FIG. 2, the liquid container according to the present invention includes a container main body 1, an ultrasonic sensor 2, reflecting means 3 and guide means 4. The configuration of the container main body 1, ultrasonic sensor 2 and reflecting means 3 is the same as in FIG. 1, and description thereof is omitted here.

The guide means 4 has a cylindrical shape having a circumferential wall. The guide means 4 is installed inside the container main body 1 so as to guide the ultrasonic wave reflected at the reflecting surface 3a of the reflecting means 3 towards the liquid surface, as well as guiding the reflected wave from the liquid surface towards the reflecting means 3. Furthermore, the guide means 4 may be integrated with the container main body 1 and the reflecting means 3, or may be installed by welding or by fixing members such as screws, bolts, or the like. The shape of the guide means 4 is not limited to this, provided that the shape is capable of guiding the ultrasonic wave reflected by the reflecting means 3 towards the liquid surface, and also guiding the reflected wave from the liquid surface towards the reflecting means 3. A further possible shape of the guide means 4 is a square tubular shape or a plate shape, etc. A cylindrical shape or a square tubular shape is desirable since this shape is effective in suppressing attenuation of the ultrasonic waves.

The material used in the guide means 4 is not limited in particular, but the material should produce no alteration of the guide means 4 and the liquid stored in the container main body 1, due to contact between the guide means 4 and the liquid stored in the container main body 1, and the same material as the container main body 1 is desirable.

Furthermore, the guide means 4 has an opening section 4*a* in such a manner that the ultrasonic waves emitted from the ultrasonic sensor 2 arrive at the reflecting surface 3*a* of the reflecting means 3. More specifically, the opening section 4*a* is provided in the lowermost portion of the circumferential wall of the guide means 4 on a side where the ultrasonic sensor 2 is disposed. The shape and size of the opening section 4*a* are not limited in particular, provided that the shape and size permit an ultrasonic wave emitted from the ultrasonic sensor 2 to pass through the opening section 4*a* and arrive at the reflecting surface 3*a* of the reflecting means 3. The guide means 4 may utilize a dimensional length which does not cover the reflecting surface 3*a* of the reflecting means 3, in which case, there is no need to provide the opening section 4*a*.

The ultrasonic wave emitted from the ultrasonic sensor 2 into the liquid passes through the opening section 4*a* and is reflected by the reflecting surface 3*a* of the reflecting means 3 towards the liquid surface, and then arrives at the liquid surface after passing through the region inside the circumferential wall of the guide means 4. The reflected wave which is further reflected by the liquid surface passes through the region inside the circumferential wall of the guide means 4, is reflected again by the reflecting surface 3*a* towards the ultrasonic sensor 2, passes through the opening section 4*a*, and arrives at the ultrasonic sensor 2. By providing the guide means 4, it is possible to reduce the effects of bubbles on the measurement, in cases where bubbles occur in the liquid stored inside the container, due to heating, shaking or the like, and it is also possible to prevent dispersion of the ultrasonic waves and thereby suppress attenuation of the ultrasonic wave.

By providing one or more holes passing though the circumferential wall of the guide means 4, separately from the opening section 4*a*, it is possible to improve the fluidity of the liquid stored in the container main body 1. There are no particular limitations on the positions of the holes, which may be in the upper, middle or lower portions of the circumferential wall of the guide means 4. Furthermore, there are no particular restrictions on the shape of the holes, which may be circular, polygonal, or another shape.

In a liquid container of this kind, by providing the guide means 4, it is possible to suppress the effects of the bubbles on measurement, in cases where bubbles occur in the liquid stored inside the container, as a result of heating or shaking, etc., and furthermore the dispersion of the ultrasonic waves is prevented, thereby suppressing attenuation of the ultrasonic waves, which means that the liquid level can be measured with high accuracy.

Figure 3:
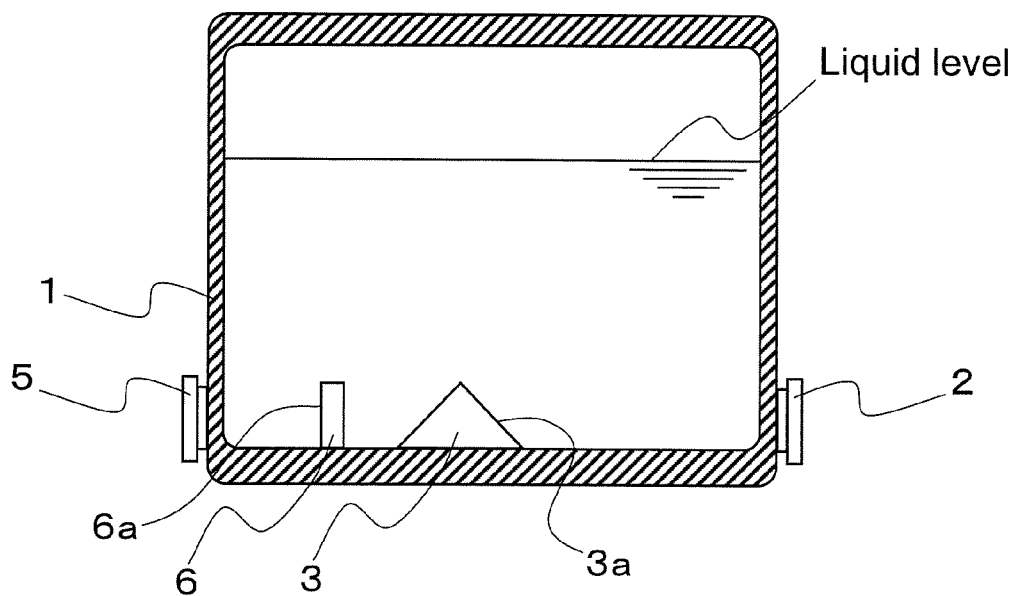
FIG. 3 is a schematic drawing of a liquid container according to the embodiment of the present invention.

FIG. 3 is a schematic drawing of a liquid container relating to a further embodiment of the present invention. In FIG. 3, the liquid container according to the present invention includes a container main body 1, an ultrasonic sensor 2, reflecting means 3, an ultrasonic sensor for calibration 5 and reflecting means for calibration 6. The configuration of the container main body 1, the ultrasonic sensor 2 and the reflecting means 3 is the same as in FIG. 1, and therefore description thereof is omitted here.

Figure 4:
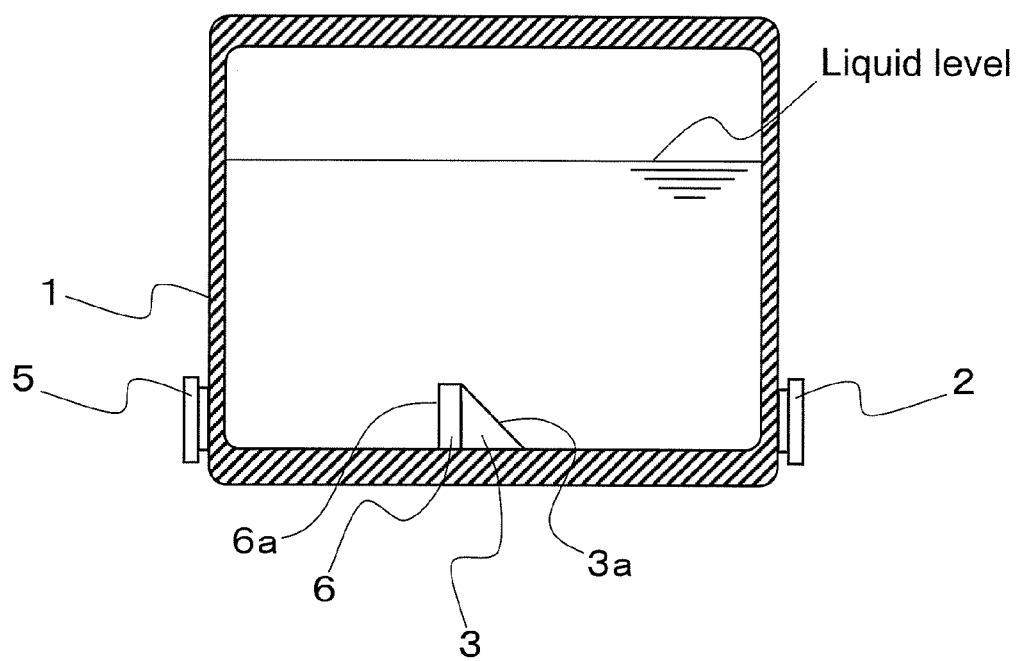
FIG. 4 is a schematic drawing of a liquid container according to the embodiment of the present invention.

FIG. 4 is a schematic drawing of a liquid container relating to a further embodiment of the present invention. In FIG. 4, the liquid container according to the present invention includes a container main body 1, an ultrasonic sensor 2, reflecting means 3, an ultrasonic sensor for calibration 5, and reflection means for calibration 6. In the liquid container shown in FIG. 3, the reflecting means 3 and the reflecting means for calibration 6 are provided separately from each other, but the liquid container shown in FIG. 4 differs from this in that the reflecting means 3 and the reflecting means for calibration 6 are integrated with each other. The configuration of the container main body 1, the ultrasonic sensor 2 and the reflecting means 3 is the same as FIG. 1, and therefore description thereof is omitted here.

The ultrasonic sensor for calibration 5 is installed on the container main body 1 in a state of contact with the lowermost portion of the outer surface of the side wall of the container main body 1. The ultrasonic sensor for calibration 5 may be fixed to the outer surface of the side wall of the container main body 1, or may be provided detachably. An ultrasonic wave from the ultrasonic sensor for calibration 5 is emitted into the liquid stored in the container main body 1, through the side wall. The ultrasonic sensor for calibration 5 is not limited in particular, and it is possible to use a well-known general ultrasonic sensor. Furthermore, for the ultrasonic sensor for calibration 5, it is possible to use an ultrasonic sensor of the same type as the ultrasonic sensor 2, or to use an ultrasonic sensor of a different type.

The reflecting means for calibration 6 is a cuboid member having a reflecting surface 6*a* which is perpendicular to the bottom plate, and is installed on the upper surface of the bottom plate inside the container main body 1 by welding, or by fixing members such as screws, bolts, or the like. The shape of the reflecting means for calibration 6 is not limited to this, and may be a plate shape, a cube shape, a square cone, a square bar shape, or the like, or may be formed by a combination of these shapes. Furthermore, the reflecting means for calibration 6 may be integrated with the reflecting means 3 as shown in FIG. 4. The reflecting means for calibration 6 may also be integrated with the container main body 1 and the guide means 4.

The material of the reflecting means for calibration 6 is not limited in particular, provided that the material is capable of reflecting ultrasonic waves, and more specifically, may use glass, metal, plastic, stainless steel, Teflon (registered trademark), or the like. The material of the reflecting means for calibration 6 may be the same as the material used in the container main body 1, or may be different, but if the materials are different, there is a risk that liquid leaks may occur from the joint sections, and a risk of restriction on the type of detergent that can be used when washing the interior of the container, and therefore it is desirable to use the same material as the container main body 1. Furthermore, if the liquid container of the present invention is used to store a chemical of high purity which is used as a raw material for chemical vapor-phase epitaxy, then it is especially desirable to use stainless steel as the material of the reflecting means for calibration 6, since this produces little alteration of the liquid stored inside the container.

The reflecting means for calibration 6 is arranged in such a manner that the reflecting surface 6*a* of the reflecting means for calibration 6 and the ultrasonic sensor for calibration 5 face each other. Moreover, as is well-known, the ultrasonic sensor has a region in which measurement is not possible (insensitive band), and therefore the reflecting means for calibration 6 is arranged at a position where the distance the ultrasonic wave passes through the liquid, of the ultrasonic wave path from the ultrasonic sensor for calibration 5 to the reflecting surface 6*a* of the reflecting means for calibration 6, is greater than the distance at which an insensitive band of the ultrasonic sensor for calibration 5 is obtained. The ultrasonic wave emitted into the liquid from the ultrasonic sensor for calibration 5 is reflected towards the ultrasonic sensor for calibration 5 by the reflecting surface 6a of the reflecting means for calibration 6, and arrives at the ultrasonic sensor for calibration 5.

In general, when the level of the liquid stored inside the container is detected, since the speed of the ultrasonic wave transmitted through the liquid varies with the type of liquid and the temperature of the liquid stored inside the container, then there may be cases where it is not possible to measure an accurate value unless calibrated values have been prepared in advance for various conditions. Therefore, by providing the ultrasonic sensor for calibration 5 and the reflecting means for calibration 6 of this kind, it is possible to obtain a calibrated value for the speed of sound of the ultrasonic waves under the prevailing conditions relating to the type of liquid and the temperature, etc., of the liquid which is stored inside the container, when measuring the liquid level, and therefore it is possible to achieve a more accurate measurement value, even if calibrated values for various conditions have not been prepared in advance.

Figure 5:
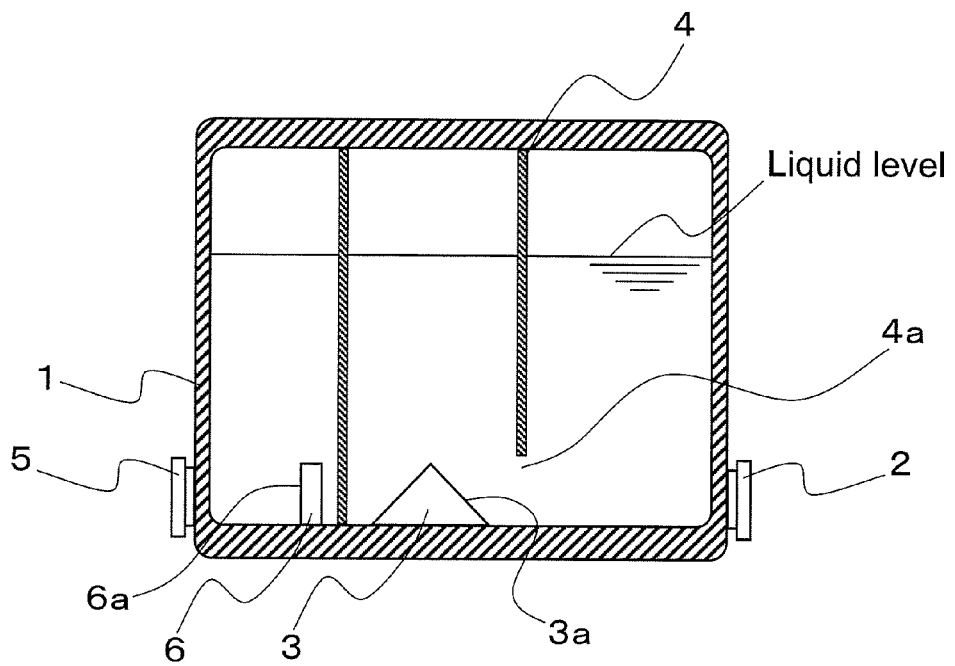
FIG. 5 is a schematic drawing of a liquid container according to the embodiment of the present invention.

FIG. 5 is a schematic drawing of a liquid container relating to a further embodiment of the present invention. In FIG. 5, the liquid container of the present invention includes a container main body 1, an ultrasonic sensor 2, reflecting means 3, guide means 4, an ultrasonic sensor for calibration 5 and reflection means for calibration 6. The configuration of the container main body 1, the ultrasonic sensor 2, the reflecting means 3 and the guide means 4 is the same as in FIG. 2, and the configuration of the ultrasonic sensor for calibration 5 is the same as in FIG. 3, and therefore description thereof is omitted here. The reflecting means for calibration 6 is disposed in an outer region of the circumferential wall of the guide means 4. The remainder of the configuration of the reflecting means for calibration 6 is the same as in FIG. 3, and therefore description thereof is omitted here.

Figure 6:
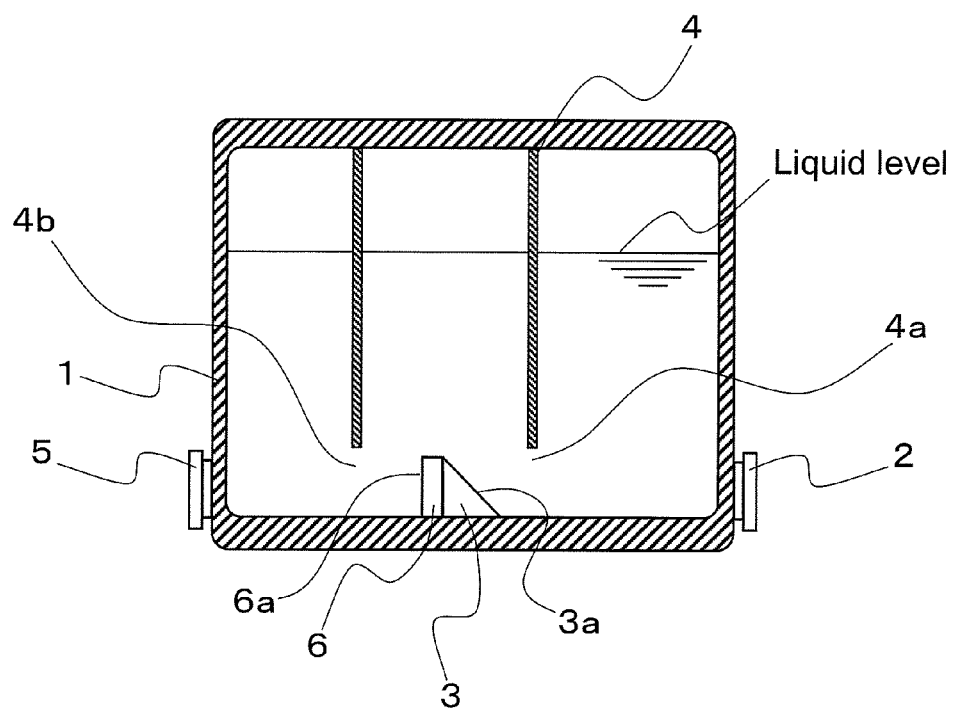
FIG. 6 is a schematic drawing of a liquid container according to the embodiment of the present invention.

FIG. 6 is a schematic drawing of a liquid container relating to a further embodiment of the present invention. In FIG. 6, the liquid container of the present invention includes the container main body 1, the ultrasonic sensor 2, the reflecting means 3, the guide means 4, the ultrasonic sensor for calibration 5 and the reflecting means for calibration 6, and the reflecting means 3 and the reflecting means for calibration 6 are integrated with each other. The configuration of the container main body 1, the ultrasonic sensor 2, the reflecting means 3, the ultrasonic sensor for calibration 5 and the reflecting means for calibration 6 is the same as in FIG. 4, and therefore description thereof is omitted here.

The guide means 4 has an opening section 4b in such a manner that an ultrasonic wave emitted from the ultrasonic sensor for calibration 5 can arrive at the reflecting surface 6a of the reflecting means for calibration 6. More specifically, the opening section 4b is provided in the bottommost portion of the circumferential wall of the guide means 4 in the direction in which the ultrasonic sensor for calibration 5 is disposed. The shape and size of the opening section 4b are not limited in particular, provided that the shape and size are such that an ultrasonic wave emitted from the ultrasonic sensor for calibration 5 can pass through the opening section 4b and arrive at the reflecting surface 6a of the reflecting means for calibration 6. The guide means 4 may be means having a dimensional length which does not cover the reflecting surface 6a of the reflecting means for calibration 6, in which case, it is not necessary to provide the opening section 4b. The remainder of the configuration of the guide means 4 is the same as in FIG. 2, and therefore description thereof is omitted here.

Figure 7:
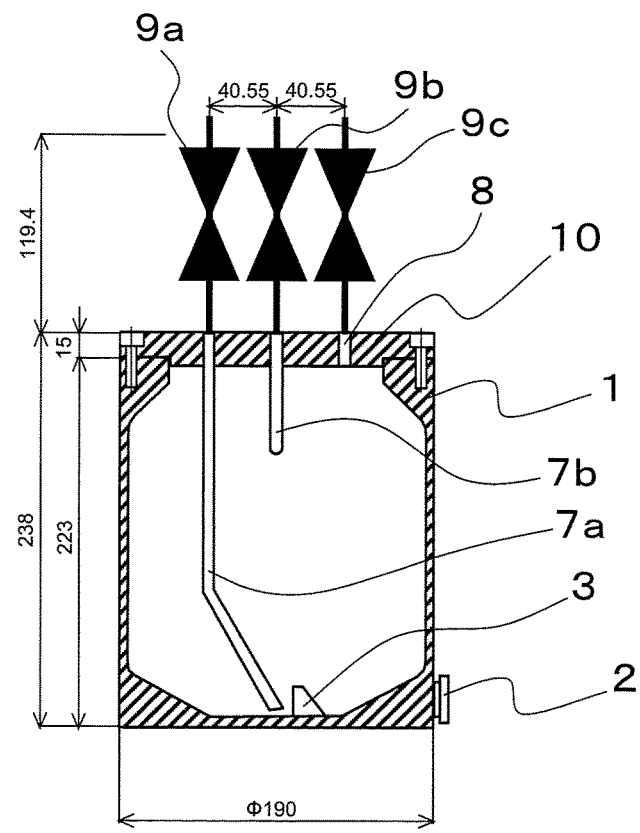
FIG. 7 is a cross-sectional drawing of a liquid container according to the embodiment of the present invention.
Figure 8:
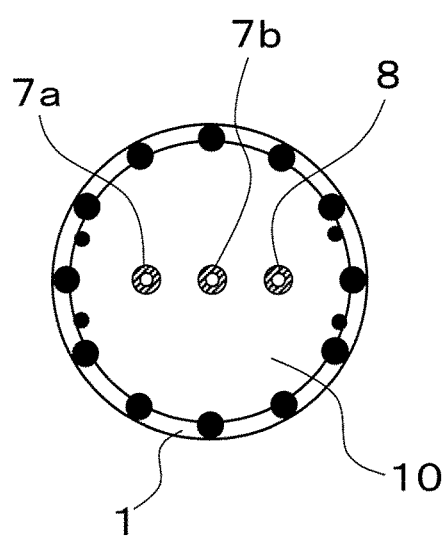
FIG. 8 is a schematic drawing of the liquid container shown in FIG. 7 as viewed from above.

FIG. 7 is a cross-sectional diagram of the side surface of a liquid container relating to a further embodiment of the present invention, and FIG. 8 is a diagram of the liquid container shown in FIG. 7 as viewed from above. The liquid containers illustrated in FIG. 7 and FIG. 8 are the same. In FIG. 7, the liquid container according to the present invention includes a container main body 1, an ultrasonic sensor 2, reflecting means 3, first liquid transporting means 7a, second liquid transporting means 7b, gas transporting means 8, control mechanisms 9a, 9b, 9c and an opening and closing mechanism 10. The configuration of the container main body 1, the ultrasonic sensor 2 and the reflecting means 3 is the same as in FIG. 3, and therefore description thereof is omitted here.

The first liquid transporting means 7a has a tubular shape which is passed through the container main body 1 and is installed on the container main body 1 by welding, or by fixing members such as screws, bolts, or the like. The shape of the first liquid transporting means 7a is not limited to this, provided that the shape enables the liquid to be transported. The end of the first liquid transporting means 7a which is inserted inside the container main body 1 extends up to the vicinity of the upper surface of the bottom plate inside the container main body 1. By providing the first liquid transporting means 7a of this kind, it is possible to introduce liquid into the container main body 1 and to discharge the stored liquid to outside the system.

The second liquid transporting means 7b has a tubular shape which is passed through the container main body 1 and is installed on the container main body 1 by welding, and by fixing members such as screws, bolts, or the like. The shape of the second liquid transporting means 7b is not limited to this, provided that the shape enables the liquid to be transported. The end of the second liquid transporting means 7b inserted into the container main body 1 is positioned above the end of the first liquid transporting means 7a inserted into the container main body 1. By providing the second liquid transporting means 7b of this kind, even if the first liquid transporting means 7a is blocked and cannot be used, it is still possible to introduce liquid into the container main body 1 and to discharge the stored liquid to outside the system. Moreover, by introducing a cleaning liquid into the container main body 1 from the second liquid transporting means 7b, it is possible to clean the interior of the container efficiently.

The material of the first liquid transporting means 7a and the second liquid transporting means 7b is not limited in particular, but should be a material that does not change the quality of these means when the first liquid transporting means 7a, the second liquid transporting means 7b, and the liquid come into contact with one another. All this being said, it is preferable that these means are formed from the same material as that of the container main body 1.

The first liquid transporting means 7a and the second liquid transporting means 7b are disposed in such a manner that the portions of the first liquid transporting means 7a and the second liquid transporting means 7b which are inserted inside the container main body 1 are not located on the path of the ultrasonic wave, so as not to obstruct the ultrasonic wave emitted into the liquid from the ultrasonic sensor 2.

The gas transporting means 8 has a tubular shape which is passed through the container main body 1 and is installed on the container main body 1 by welding or by fixing members such as screws, bolts, or the like. The gas transporting means 8 is not limited to this, provided that it has a shape which enables transportation of gas. The gas transporting means 8 is disposed in such a manner that the end of the gas transporting means 8 is above the liquid surface when the container is stationary, so that the portion of the gas transporting means 8 which is inserted inside the container main body 1 does not contact the liquid stored in the container main body 1. The gas transporting means 8 may have a function of evacuating the interior of the container main body 1 to create a vacuum, or may have a function of injecting gas inside the container main body 1. If the gas transporting means 8 has a function of evacuating the interior of the container main body 1 to create a vacuum, then this is desirable for a container of a raw material for chemical vapor-phase epitaxy, which is used in the manufacture of semiconductors, and the like. The reason for this is that, with the liquid container according to the present invention, the medium through which the ultrasonic wave is transmitted is a liquid, and therefore it is possible to accurately measure the liquid level, even if the interior of the container main body 1 is in a vacuum state. Furthermore, by injecting gas inside the container main body 1 from the gas transporting means 8, it is possible to readily discharge the liquid from the first liquid transporting means 7a or the second liquid transporting means 7b, to outside the system.

The material of the gas transporting means 38 is not limited in particular, provided that the material does not produce any alteration of the gas transporting means 8 or the transported gas, upon contact therebetween, but it is desirable to use the same material as the container main body 1.

The first liquid transporting means 7a, the second liquid transporting means 7b and the gas transporting means 8 each have control mechanisms 9a, 9b, 9c, which are typically valves, on the outside of the container main body 1. There are no particular restrictions on the valves, which may be generally used well-known valves, but possible examples are a gate valve, ball valve, diaphragm valve, and the like.

The opening and closing mechanism 10 is a lid provided on the ceiling plate of the container main body 1. The opening and closing mechanism 10 has a circular disk shape, which may be fixed to the container main body 1 by fixing members such as screws, bolts or the like, or may be detachable. The shape of the opening and closing mechanism 10 is not limited to this.

The material of the opening and closing mechanism 10 is not limited in particular, but should be a material that does not change the quality of this mechanism. All this being said, it is preferable that the mechanism is formed from the same material as that of the container main body 1.

Furthermore, according to requirements, it is possible to provide coupling means on the ceiling plate, side walls and bottom plate of the container main body 1, and to fix the liquid container itself to a base, or the like, or to fix pipes connected to the liquid container. Possible examples of the coupling means are fixing members such as screws, bolts, or the like.

Moreover, the level of the liquid stored in the liquid container of the present invention can be determined by measuring the time from emission of an ultrasonic wave from the ultrasonic sensor until reception thereof, converting the measured times into a distance, and subtracting, from this distance, the distance travelled through the liquid in the ultrasonic wave path from the ultrasonic sensor to the reflecting surface of the reflecting means.

As described above, the liquid container according to the present invention is capable of measuring the liquid level in a short time, without being affected by the insensitive band of the ultrasonic sensor, even when the liquid level is low. Furthermore, the liquid container provided with the guide means of the present invention can reduce the effects on measurement when measuring a liquid level, even in the event of bubbles occurring in the liquid stored inside the container due to heating, shaking, or the like, and can suppress attenuation of ultrasonic waves by preventing dispersion of the ultrasonic waves, and therefore the liquid level can be measured with high accuracy. Moreover, the liquid container provided with an ultrasonic sensor for calibration and the reflecting means for calibration according to the present invention can measure the liquid level accurately, even without preparing calibrated values for various conditions in advance. Furthermore, the liquid container provided with gas evacuating means according to the present invention can be used suitably for storing a high-purity compound which is used as a raw material for chemical vapor-phase epitaxy.

EXAMPLES

The present invention is described in further detail by means of examples. However, the present invention is not restricted in any way to the following examples.

Example 1

Figure 9:
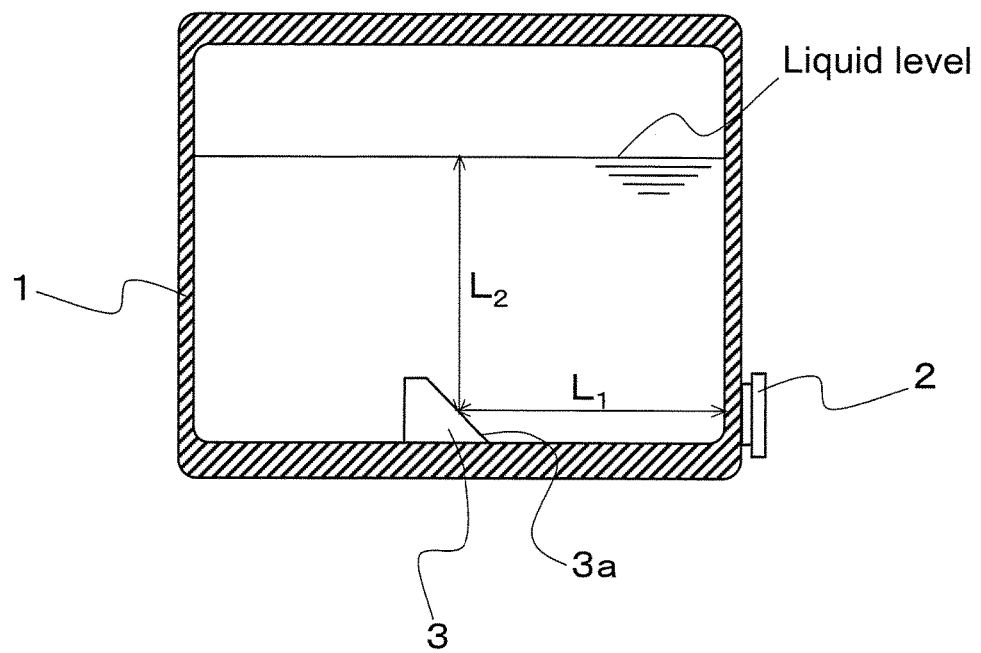
FIG. 9 is a schematic drawing showing $L_1$ and $L_2$ in the liquid container used in Example 1.

The liquid level was measured using the liquid container according to the present invention. FIG. 9 shows an embodiment of the liquid container used in Example 1. Here, $L_1$ represents the distance travelled through the liquid by the ultrasonic wave, of the ultrasonic wave path from the ultrasonic sensor 2 to the reflecting surface 3a of the reflecting means 3, and $L_2$ represents the distance from the reflecting surface 3a of the reflecting means 3 to the liquid surface. $L_1+L_2$ is measured assuming that $L_1=60$ mm and $L_2=20$ mm. Since $L_1$ is uniform, then it is possible to calculate the liquid level by subtracting $L_1$ from $L_1+L_2$. The insensitive band of the ultrasonic sensor is 30 mm. The results are shown in Table 1.

Comparative Example 1

Figure 10:
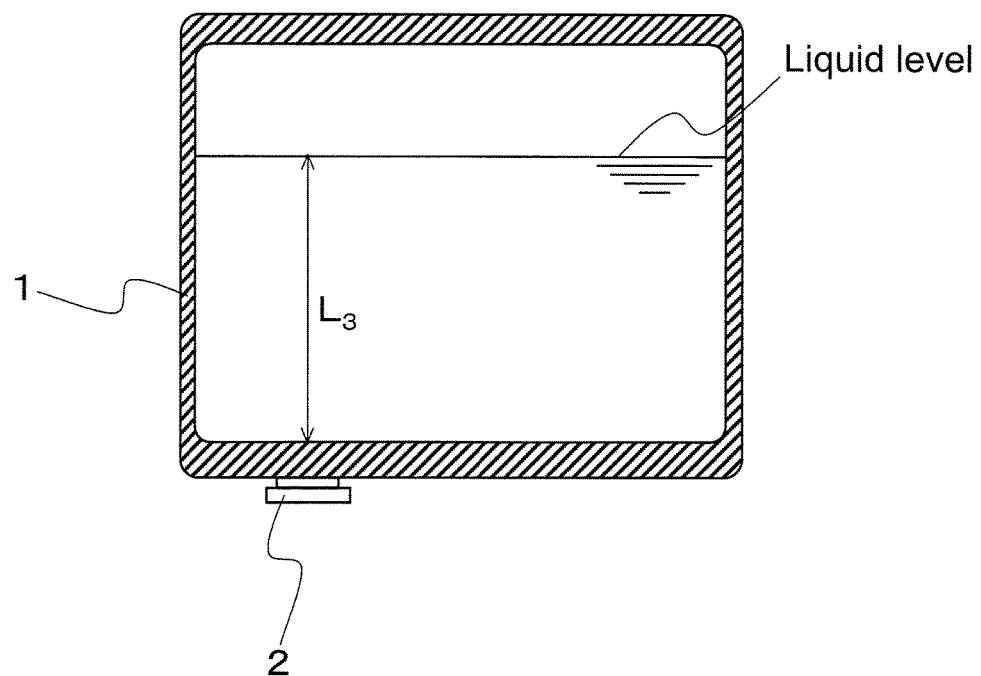
FIG. 10 is a schematic drawing showing $L_3$ in the liquid container used in comparative example 1.

The liquid level was measured by using a liquid container having an ultrasonic sensor provided in the outer bottom portion of the container main body. FIG. 10 shows an embodiment of the liquid container which was used in Comparative Example 1. Here, $L_3$ represents the distance travelled through the liquid by the ultrasonic wave, of the ultrasonic wave path from the ultrasonic sensor 2 to the liquid surface. This is measured as $L_3=20$ mm. The insensitive band of the ultrasonic sensor is 30 mm. The results are shown in Table 1.

TABLE 1

| | $L_1$ | $L_2$ | $L_1 + L_2$ | $L_3$ | Measurement result |
|---|---|---|---|---|---|
| Example 1 | 60 mm | 20 mm | 80 mm | — | 81 mm |
| Comparative Example 1 | — | — | — | 20 mm | Not measurable *1 |

*1 The liquid level is in the insensitive band of the ultrasonic sensor and therefore cannot be measured.

From the results in Example 1, it can be seen that, according to the present invention, the level of liquid stored inside the container can be measured accurately even if the liquid level is lower than the insensitive band of the ultrasonic sensor.

EXPLANATION OF NUMERALS 1 container main body, 2 ultrasonic sensor, 3 reflecting means, 3a reflecting surface, 4 guide means, 4a and 4b opening section, 5 ultrasonic sensor for calibration, 6 reflecting means for calibration, 6a reflecting surface, 7a first liquid transporting means, 7b second liquid transporting means, 8 gas transporting means, 9a, 9b and 9c control mechanism, 10 opening and closing mechanism.

The invention claimed is:

1. A liquid container, comprising:
a container main body which stores a liquid;
an ultrasonic sensor which is disposed so as to contact an outer side wall of the container main body and so as to emit an ultrasonic wave into the liquid;
a reflecting means which is disposed at an inner bottom portion of the container main body and reflects the ultrasonic wave emitted into the liquid from the ultrasonic sensor towards a surface of the liquid; and
a guide means for guiding the ultrasonic wave reflected by the reflecting means towards the surface of the liquid, and for guiding a reflected wave from the surface of the liquid towards the reflecting means,
wherein the reflecting means is disposed at a position where a distance the ultrasonic wave travels through the liquid in a path of the ultrasonic wave from the ultrasonic sensor to a reflecting surface of the reflecting means, is greater than a distance at which an insensitive band of the ultrasonic sensor is obtained, and
wherein the guide means extends in a direction perpendicular to the path of the ultrasonic wave from the ultrasonic sensor to the reflecting surface of the reflecting means.

2. The liquid container according to claim 1, wherein the ultrasonic sensor is a first ultrasonic sensor which is disposed so as to emit a first ultrasonic wave into the liquid, the reflecting means is a first reflecting means, and the liquid container further comprises:
a second ultrasonic sensor for calibration which is disposed so as to contact the outer side wall of the container main body and so as to emit a second ultrasonic wave into the liquid; and
a second reflecting means for calibration, which is disposed at the inner bottom portion of the container main body and reflects the second ultrasonic wave emitted into the liquid from the second ultrasonic sensor for calibration towards the second ultrasonic sensor for calibration.

3. The liquid container according to claim 1, further comprising gas evacuating means for evacuating gas from an interior of the container main body to create a vacuum.

4. A method for measuring a level of liquid stored in a liquid container according to claim 1,
the method comprising:
measuring a time from emission of the ultrasonic wave from the ultrasonic sensor until reception thereof;
converting the time which has been measured into a distance; and
subtracting, from the distance which has been converted from the time which has been measured, the distance the ultrasonic wave travels through the liquid in the path of the ultrasonic wave from the ultrasonic sensor to the reflecting surface of the reflecting means.

5. The liquid container according to claim 1, wherein the ultrasonic sensor is a first ultrasonic sensor which is disposed so as to emit a first ultrasonic wave into the liquid, the reflecting means is a first reflecting means, the outer side wall of the container main body is a first outer side wall of the container main body, and the liquid container further comprises:
a second ultrasonic sensor for calibration which is disposed so as to contact a second outer side wall of the container main body and so as to emit a second ultrasonic wave into the liquid; and
a second reflecting means for calibration, which is disposed at the inner bottom portion of the container main body and reflects the second ultrasonic wave emitted into the liquid from the second ultrasonic sensor for calibration towards the second ultrasonic sensor for calibration.

6. The liquid container according to claim 1, wherein the guide means has a cylindrical shape having a circumferential wall.

7. The liquid container according to claim 6, wherein one or more holes pass through the circumferential wall of the guide means.

8. A liquid container, comprising:
a container main body which stores a liquid;
an ultrasonic sensor which is disposed so as to contact an outer side wall of the container main body and so as to emit an ultrasonic wave into the liquid;
a member having a reflecting surface which is disposed at an inner bottom portion of the container main body and reflects the ultrasonic wave emitted into the liquid from the ultrasonic sensor towards a surface of the liquid; and
a wall for guiding the ultrasonic wave reflected by the member having the reflecting surface towards the surface of the liquid, and for guiding a reflected wave from the surface of the liquid towards the member having the reflecting surface,
wherein the member having the reflecting surface is disposed at a position where a distance the ultrasonic wave travels through the liquid in a path of the ultrasonic wave from the ultrasonic sensor to the reflecting surface, is greater than a distance at which an insensitive band of the ultrasonic sensor is obtained, and
wherein the wall extends in a direction perpendicular to the path of the ultrasonic wave from the ultrasonic sensor to the reflecting surface.

9. The liquid container according to claim 8, wherein the ultrasonic sensor is a first ultrasonic sensor which is disposed so as to emit a first ultrasonic wave into the liquid, the member having the reflecting surface is a first member having a first reflecting surface, and the liquid container further comprises:
a second ultrasonic sensor for calibration which is disposed so as to contact the outer side wall of the container main body and so as to emit a second ultrasonic wave into the liquid; and
a second member having a second reflecting surface for calibration, which is disposed at the inner bottom portion of the container main body and reflects the second ultrasonic wave emitted into the liquid from the second ultrasonic sensor for calibration towards the second ultrasonic sensor for calibration.

10. The liquid container according to claim 8, wherein the ultrasonic sensor is a first ultrasonic sensor which is disposed so as to emit a first ultrasonic wave into the liquid, the member having the reflecting surface is a first member having a first reflecting surface, the outer side wall of the container main body is a first outer side wall of the container main body, and the liquid container further comprises:

a second ultrasonic sensor for calibration which is disposed so as to contact a second outer side wall of the container main body and so as to emit a second ultrasonic wave into the liquid; and a second member having a second reflecting surface for calibration, which is disposed at the inner bottom portion of the container main body and reflects the second ultrasonic wave emitted into the liquid from the second ultrasonic sensor for calibration towards the second ultrasonic sensor for calibration.

11. The liquid container according to claim 8, further comprising a tube for evacuating gas from an interior of the container main body to create a vacuum.

12. A method for measuring a level of liquid stored in a liquid container according to claim 8, the method comprising:

measuring a time from emission of the ultrasonic wave from the ultrasonic sensor until reception thereof;

converting the time which has been measured into a distance; and subtracting, from the distance which has been converted from the time which has been measured, the distance the ultrasonic wave travels through the liquid in the path of the ultrasonic wave from the ultrasonic sensor to the reflecting surface.

13. The liquid container according to claim 8, wherein the wall has a cylindrical shape and is a circumferential wall.

14. The liquid container according to claim 13, wherein one or more holes pass through the circumferential wall.

* * * * *